United States Patent [19]

Sharp et al.

[11] Patent Number: 4,752,669

[45] Date of Patent: Jun. 21, 1988

[54] METHOD AND APPARATUS FOR LASER PROCESSING OF MATERIALS

[75] Inventors: Charles M. Sharp, Landing; Ronald D. Young, Blairstown, both of N.J.

[73] Assignee: PRC Corporation, Landing, N.J.

[21] Appl. No.: 942,224

[22] Filed: Dec. 16, 1986

[51] Int. Cl.[4] .......................................... B23K 56/00
[52] U.S. Cl. ....................... 219/121 LG; 219/121 LC; 219/121 LA; 219/121 LN
[58] Field of Search .... 219/121 L, 121 LM, 121 LA, 219/121 LB, 121 LC, 121 LD, 121 LL, 121 LK, 121 LH, 121 LJ, 121 LN, 121 LG; 372/25

[56] References Cited

U.S. PATENT DOCUMENTS

| | | | |
|---|---|---|---|
| 3,689,159 | 9/1972 | Taniguchi et al. | 219/121 LG X |
| 3,720,884 | 3/1973 | Kelley et al. | 372/25 |
| 3,860,784 | 1/1975 | Brown et al. | 219/121 LD |
| 3,935,417 | 1/1976 | Umino et al. | 219/121 LD X |
| 3,962,558 | 6/1976 | Kocher et al. | 219/121 LA X |
| 4,039,823 | 8/1977 | Jovanovic et al. | 250/199 |
| 4,281,235 | 7/1981 | Peloquin | 219/121 ED |
| 4,473,735 | 9/1984 | Steffen | 219/121 LJ |
| 4,551,606 | 11/1985 | Inoue | 219/121 EA |

Primary Examiner—C. L. Albritton
Attorney, Agent, or Firm—Antonelli, Terry & Wands

[57] ABSTRACT

An improved method of laser processing of a material by directing a laser beam against the material comprises providing the beam with a power waveform with respect to time characterized by a plurality of peak power pulses and a predetermined CW power level between the peak power pulses such that the average beam power maintained is equal to or greater than the predetermined CW power level of the beam. The method is particularly adapted for cutting material such as aluminum, copper and stainless steel with improved cut quality at a relatively high cutting speed and for welding.

28 Claims, 4 Drawing Sheets

MODULATOR BLOCK DIAGRAM

FIG. 4.
MODULATOR BLOCK DIAGRAM

FIG. 6.

METHOD AND APPARATUS FOR LASER PROCESSING OF MATERIALS

BACKGROUND AND SUMMARY OF THE INVENTION

The present invention is directed to a method of processing a material by directing a laser beam against the material. More particularly, the invention is directed to a method of laser cutting a material which improves the quality of the cut while maintaining high cutting speed.

Laser cutting of materials such as copper and aluminum is difficult because of their high reflectivity, high thermal conductivity and high thermal diffusivity. In order to overcome these problems, it is necessary to generate the highest possible power density in the focused spot of the laser beam directed against the material to be cut by minimizing the focused spot diameter. This may be achieved by using a low order mode laser output such as $TEM_{00}$ and optimizing the focusing optics to give minimum abberation.

A typical set of conditions for cutting aluminum is as follows:
Material thickness 0.090 inch
Power 1,000 watts CW (continuous wave)
Mode $TEM_{00}$
Speed 80 inches/minute
Kerf width 0.005 inch.

While using the above conditions, complete penetration can be achieved. However, the cut quality is poor due to a metallic burr which adheres strongly to the underside of the cut. In the case of 0.090 inch aluminum, this burr may be 0.020–0.040 inch in height. The main reasons for this burr are that the molten aluminum and its oxides are viscous and that the narrow-cut kerf does not allow sufficient flow of cutting gas down through the cut channel to eject the molten material.

It is known that this burr problem can be solved by broadening the kerf width by increasing the focused spot diameter of the laser beam directed against the material being cut. However, this solution is not very desirable because with an increase in the kerf width, the laser power required to maintain the power density necessary to overcome the reflectivity problems becomes very high, so that the cutting process is not possible or the efficiency thereof is very low. For example, if the kerf width is doubled, the laser power has to be increased by a factor of X4 to maintain the power density necessary to overcome the reflectivity problems. Increasing the kerf width is also disadvantageous, because the volume of dross that has to be ejected during cutting increases.

Figure 1:
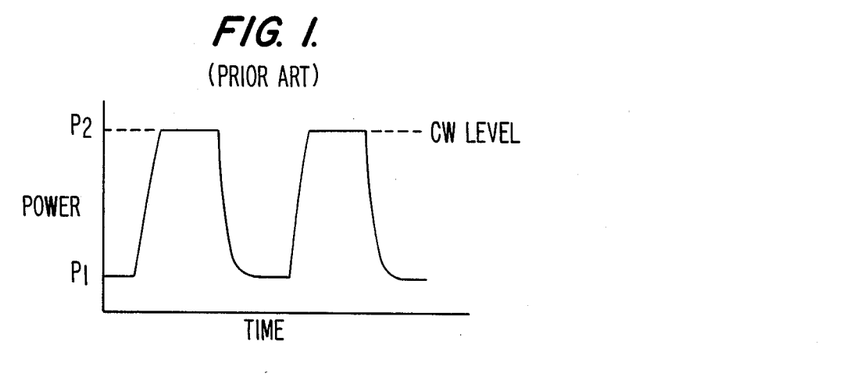
FIG. 1 is a diagram showing the power waveform with respect to time for a gated pulsed laser beam from a $CO_2$ laser.
Figure 2:
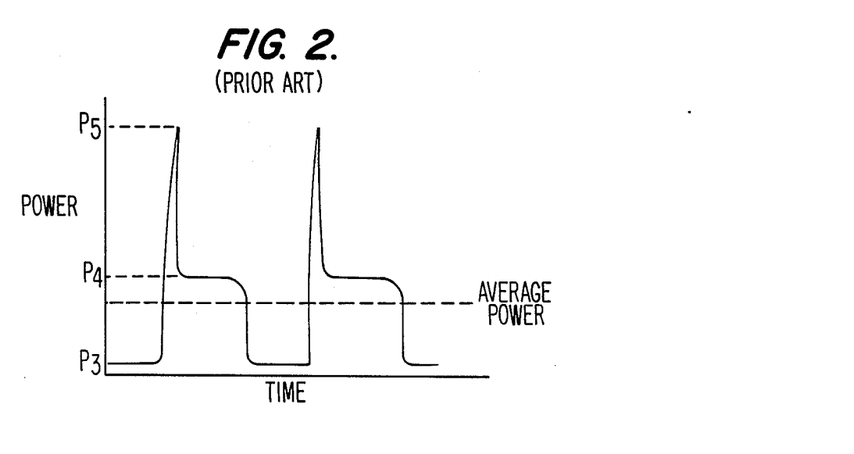
FIG. 2 is the power waveform with respect to time of a gated pulsed laser beam with enhanced pulsing or super-pulsing to provide peaks of power pulses on the leading edge of the gated pulses of the laser beam.

Conventionally, materials have been laser processed with a continuous wave (CW) or one of two types of pulsing. One of these types of pulsing is gated pulsing wherein the laser beam has a power waveform with respect to time as shown in FIG. 1 of the drawings. In gated pulsing, the power output is switched between two CW power levels, $P_1$ and $P_2$, $P_2$ being the maximum CW output. The second type of pulsing used in $CO_2$ laser processing is referred to as superpulsing or enhanced pulsing. The laser beam in superpulsing has a waveform with respect to time as shown in FIG. 2 of the drawings. The power output in superpulsing is switched between two CW power levels $P_3$ and $P_4$ as in gated pulsing with the addition of a pulse of peak power $P_5$ which typically is three times the CW power level $P_4$. This is referred to as the power enhancement factor. The average power is determined by the duty cycle, but is typically 20–50% less than the CW level $P_4$. The second known approach to solving the burr problem in laser cutting of materials such as copper and aluminum is to use superpulsing. This does reduce the burr, but processing speeds are low, typically half the CW rate, due to the lower average power and the discontinuous nature of the process.

An object of the present invention is to provide an improved method of processing a material by directing a laser beam against the material which avoids the aforementioned problems and disadvantages with the known methods of laser beam processing of a material. More particularly, an object of the invention is to provide a method of laser cutting a material wherein the cut quality is improved by reducing the height of the burrs remaining on the cut material while maintaining high cutting speed.

These and other objects of the invention are attained according to the invention by providing the laser beam which is directed against the material during the processing of the material with a power waveform with respect to time which is characterized by a plurality of peak power pulses which exceed a maximum continuous wave (CW) power level at which the laser device can continuously operate and a predetermined CW power level which is sustained substantially constantly during the time between the peak power pulses. According to another feature of the invention, the CW power level directly follows each of the peak power pulses such that the average power level of the laser power waveform is equal to or greater than the predetermined CW power level.

In the disclosed preferred form of the invention for cutting, the laser beam is a low order mode laser output of a laser such as $TEM_{00}$ which is focused to minimize the beam diameter or spot size directed against the material whereby a relatively high power density of the beam is obtained for processing the material. The power of the peak power pulses is preferably at least about 3 times that of the CW power level. The CW power level is maintained continuously between the peak power pulses according to the preferred embodiment. A duration of each of the peak power pulses is less than one half the time between the peak power pulses in this disclosed embodiment. The frequency of the peak power pulses can vary depending on process requirements, but is preferably at least one 1 kHz in the disclosed example of the method.

Aluminum, copper and stainless steel as well as other metals and non-metals can be cut according to the method of the invention at cutting speeds achieved with a CW laser beam with the burrs remaining on the cut edges after laser cutting being reduced to a height less than that which occurs with CW laser cutting. The method of the invention is also applicable for other types of material processing including welding, surface etching, machining, etc. with good results.

These and other objects, features and advantages of the present invention will become more apparent from the following description when taken in connection with the accompanying drawings which shown, for purposes of illustration only, one embodiment in accordance with the present invention.

DETAILED DESCRIPTION OF THE DISCLOSED EMBODIMENT

Figure 3:
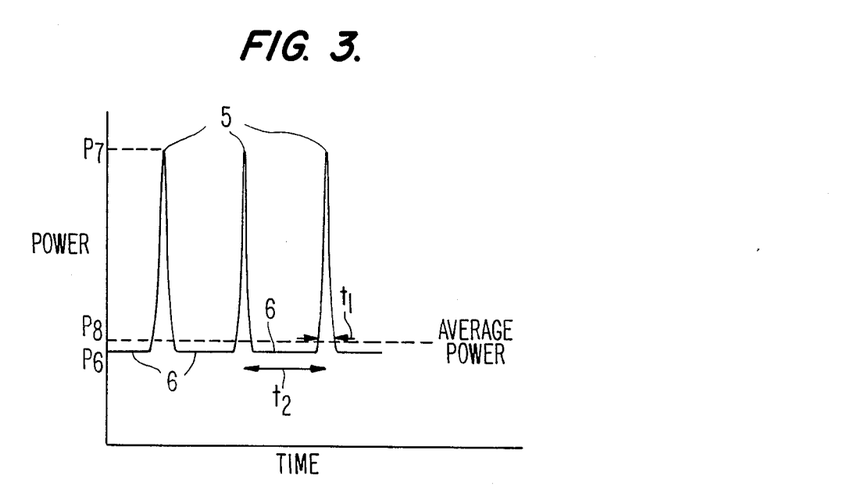
FIG. 3 is a power waveform with respect to time of a laser beam for material processing according to the method of the invention.
Figure 4:
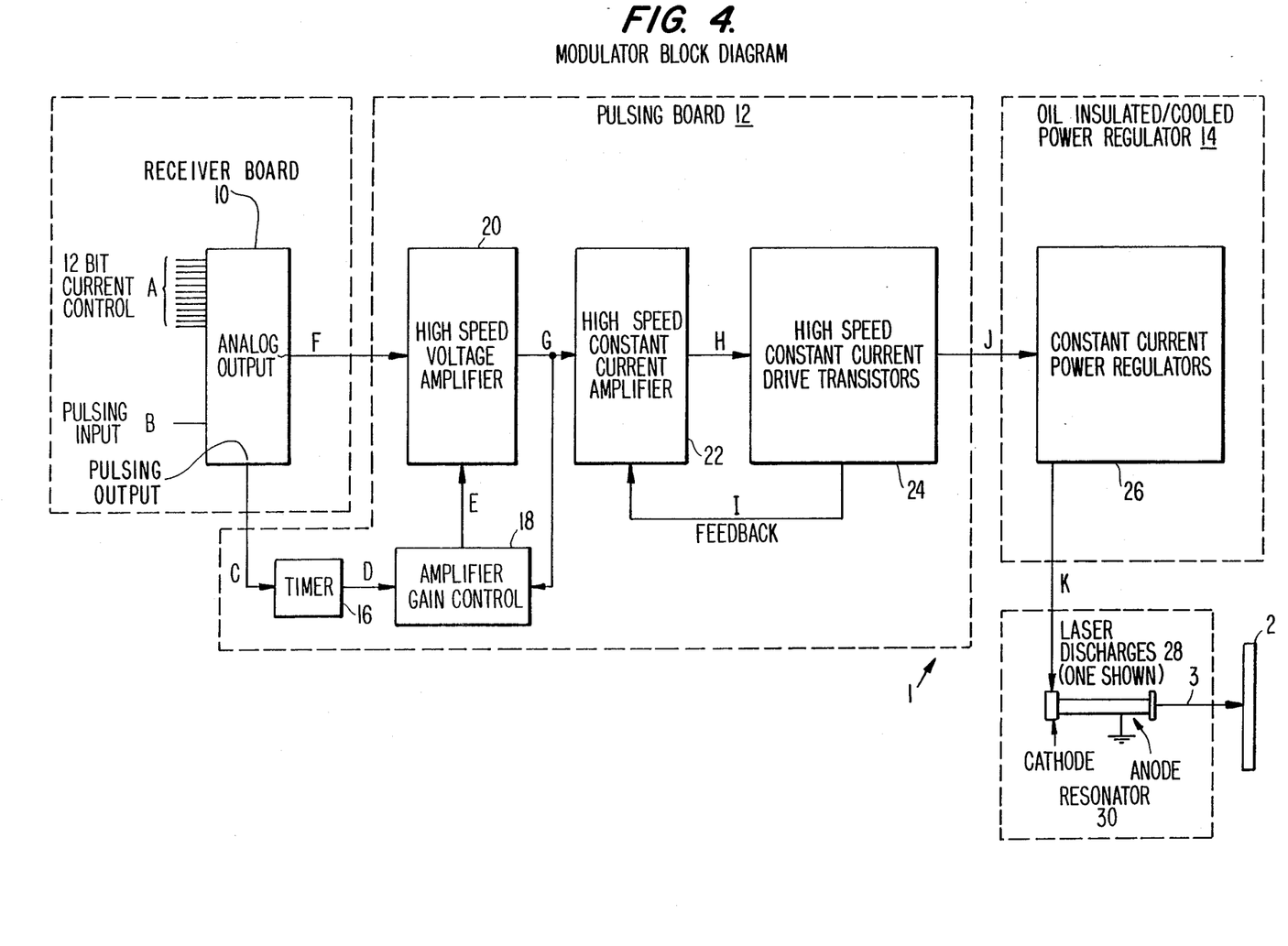
FIG. 4 is a block diagram of a laser apparatus including a circuit for producing a laser beam having a power waveform according to the invention.

Referring now to the drawings, the method of processing a material according to the invention comprises the step of directing a laser beam from a laser apparatus 1, shown schematically in FIG. 4, against a material 2 to be processed. The laser beam 3 from the apparatus 1 which is directed against the material 2 has a power waveform 4 with respect to time as illustrated in FIG. 3 of the drawings. The power waveform is characterized by a plurality of peak power pulses 5 and a lower CW (continuous wave) power level 6 between the peak power pulses 5 such that the average beam power $P_8$ maintained is equal to or greater than the lower CW power level 6 of the beam.

It has been found that with $CO_2$ laser processing of materials according to the invention, the size of the metallic burr adhering strongly to underside of the cut can be reduced from the 0.020–0.040 inch height occurring with the use of a CW laser beam to 0.010 inch maximum while maintaining the cutting speeds at the same rate as that with a CW laser beam in cut aluminum sheet 0.090 inch thick, for example. More particularly, in a method of the invention, 0.090 inch thick aluminum was cut using a CW power level 6 having a power $P_6$ of 1,000 watts continuously between peak power pulses $P_5$ having a peak power $P_7$ of 3,000 watts, so that the average beam power $P_8$ maintained was equal to or greater than the CW power level $P_6$ of the beam. The laser mode was $TEM_{00}$ and the kerf width 0.005 inch. The frequency of the peak power pulses was 1 kHz and the duration of the peak power pulses 150 μs. The speed of cutting achieved was 80 inches/min. As indicated above, the size of the burr adhering to the underside of the aluminum adjacent the cut was reduced to 0.010 inch maximum as compared with a maximum burr height of 0.040 inch where the same material was cut with a 1,000 watt CW laser beam, mode $TEM_{00}$ at 80 inches/min. and with a kerf width of 0.005 inch in an aluminum material of 0.090 inch thickness.

According to the preferred form of the disclosed method, the CW power level $P_6$ is maintained continuously between the peak power pulses 5. The CW power level $P_6$ can be as high as the laser limit in terms of being the maximum power at which the laser can operate continuously without destruction (i.e., the maximum CW power level). It is possible to exceed this maximum CW power level for short pulse periods, but if the laser is continuously operated above these levels, it will be destroyed. It should be noted that this maximum CW power level $P_6$ can correspond to the CW power level $P_2$ shown in FIG. 1 and the power level $P_4$ shown in FIG. 2. The maximum CW power level $P_6$ differs from the power level such as $P_1$ of FIG. 1, which is a much lower CW level. In other words, the term "maximum CW power level" as used in this application represents a maximum power at which the laser can continuously operate, not a lower CW power level such as $P_1$ which is well below the maximum level at which the laser can operate.

The frequency of the peak power pulses in FIG. 3 can be varied depending upon the process requirements such as the speed at which the material is to be processed, etc. Likewise, the duration of the peak power pulses can be varied from the 150 μs in the disclosed example depending upon process requirements. The preferred laser mode is $TEM_{00}$ with the beam focused to minimize the beam diameter of the laser beam or spot size of the laser directed against the material being processed, so that a relatively high power density of the beam is achieved. The method is applicable for processing a wide variety of materials including aluminum and aluminum alloys as referred to above, copper and copper alloys, stainless steel and other metallic and non-metallic materials as will be readily understood by the skilled artisan.

Figure 5:
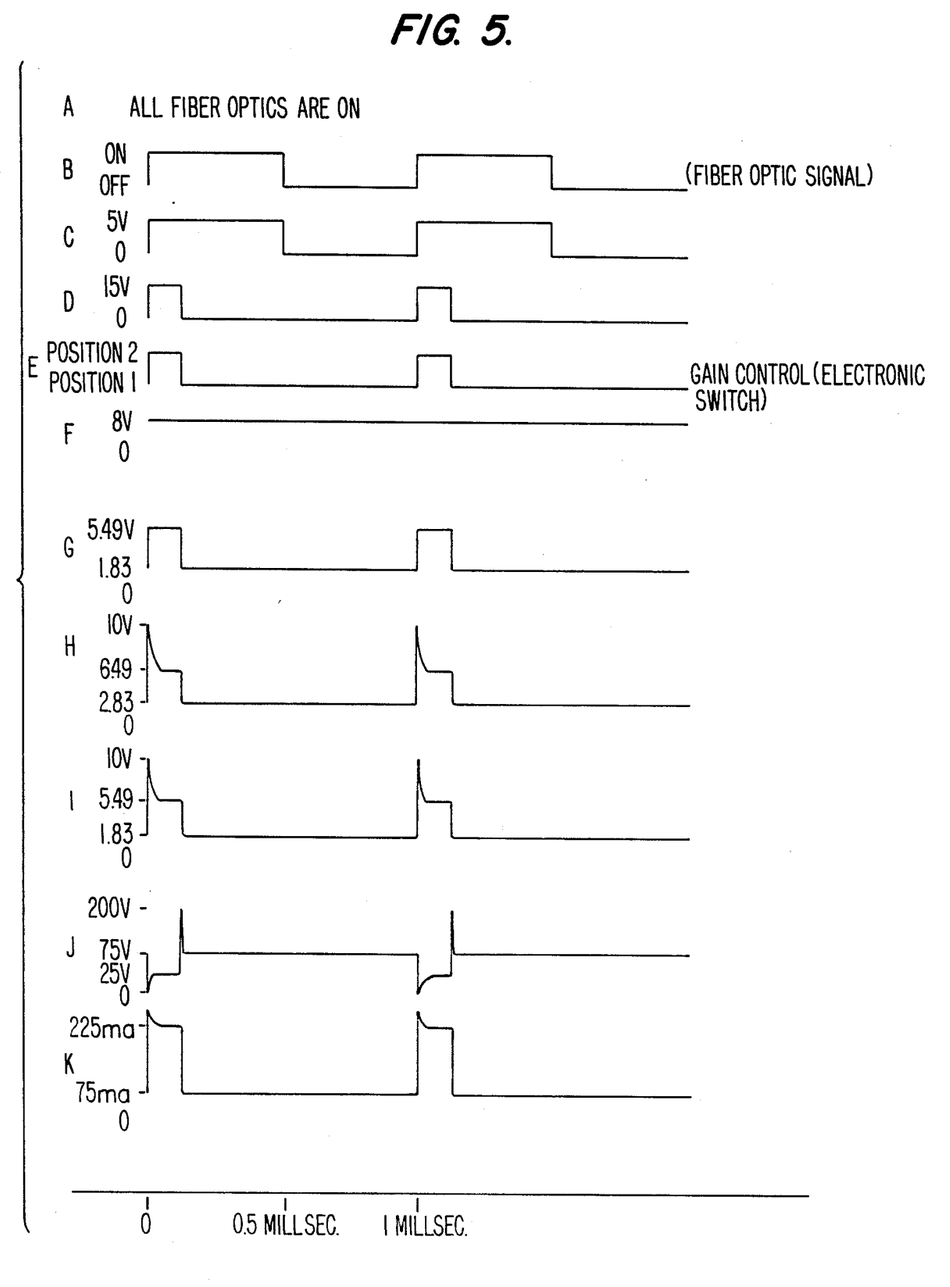
FIG. 5 is a waveform diagram showing waveforms in various portions of FIG. 4 with respect to time.

FIG. 4 is a block diagram of a laser apparatus which can carry out the above described method. FIG. 5 shows waveforms at various points in the block diagram of FIG. 4.

As can be seen in FIG. 4, the laser apparatus 1 comprises three high speed circuits shown as a receiver board 10, a pulsing board 12 and an oil insulated/cooled power regulator 14. The receiver board 10 has high speed optical link inputs for receiving twelve bit digital current control signals A and fiber optic pulses B. These separate optical links allow for the very fast rise times that are necessary for carrying out the pulsing operation of the present invention.

The receiver board 10 includes a digital-to analog converter for converting the digital twelve bit current control signal A into an analog output F to set the operating current for the system. As can be seen from the waveform diagram of FIG. 5, the receiver board 10 will also provide a pulsing output C which corresponds to the pulsing input B, with the level of the output being set by the receiver board at a desired level. For example, FIG. 5 shows the pulsing output C providing a 5 volt level when the fiber optic pulse input B is ON, and a 0 volt level when the fiber optic input pulse B is OFF. Of course, these illustrated levels are purely for purposes of examples, and different levels could be set if desired.

The pulsing board 12 has five circuits, a precise timer 16, an amplifier gain control 18, a high speed voltage amplifier 20, a high speed constant current amplifier 22 and a driver stage 24 comprised of high speed constant current driving transistors. The analog output F of the receiver board 10 is applied to the input of the high speed voltage amplifier 20. The pulse output C of the receiver board 10, on the other hand, is applied to the timer 16 to produce a timer output signal such as D shown in FIG. 5. This timer output signal D, in turn, controls a gain control circuit 18. This gain control circuit 18 is essentially an electrical switch operated by feedback from the high speed voltage amplifier 20 and the timer output D to generate a two position signal E to apply to the voltage amplifier 20.

The high speed voltage amplifier 20 operates with its analog input F and its gain control input E to produce an output such as the pulsed signal G shown in FIG. 5. The voltage levels of 5.49 volt and 1.83 volt shown there are solely for purposes of example of a typical output from the amplifier 20. As can be seen there, the lower level of the output G is not a 0 voltage level.

The amplifier 20 output G is provided as one input to a high speed constant current amplifier circuit 22. The other input to this constant current amplifier 22 is a feedback signal I from the driver stage 24. This feedback signal I will have the waveform shown in FIG. 5. Upon receiving these two inputs G and I, the constant current amplifier 22 will produce an output such as that shown by H in FIG. 5.

The output H of the amplifier 22 is applied to the driver stage 24. This driver stage 24 is made up of high speed transistors which will operate with the signal H to produce an amplified high voltage output J.

The high voltage output signal J of the driver stage 24 is, in turn, applied to constant current power regulator 26 in the oil insulated/cooled power regulator 14. This constant current power regulator 26 will operate on the high voltage signal J to produce the laser driving signal K having a lower 75 ma level with a pulsed 225 ma level. This laser driving signal K will operate in conjunction with laser discharges 28 of the $CO_2$ laser resonator 30 (which converts the electrical energy into the laser beam 3) to produce the 1,000 Watt CW output of FIG. 3 when the signal K has the 75 ma level and the 3,000 Watt pulse level when the signal K has the 225 ma level. In this example, the 1,000 Watt level can be the maximum CW level, although the invention is not limited to this.

An important aspect of the constant current power regulators is that they are oil insulated. This oil insulation allows for better cooling than can be obtained with air insulation. This, in turn, allows shorter leads to be used between the regulator 14 and the pulsing board 12. The shorter lead length, in turn, permits a faster rise time than would otherwise be possible.

Regarding the operation of the circuitry shown in FIG. 4, it should be noted that when the pulsing fiber optic is pulsed to the receiver board 10, it, in turn, activates the timer 16 which is set to an optimum pulse length for peak laser power. The pulse width is determined by using an optical power detector (not shown). The pulse length is increased in length until the optical output from the resonator 30 no longer increases and just begins to fall.

During this pulse width, the gain of the high speed voltage amplifier 20 is increased by an exact amount by the amplifier gain control circuit 18. This provides increased drive to the high speed constant current amplifier 22 and high speed constant current drive transistor in the drive circuit 24. This, in turn, increases the current to the resonator 30 through the constant current power regulator 26 above the level set by the analog voltage. This is done for a precise length of time for maximum peak laser power.

Figure 6:
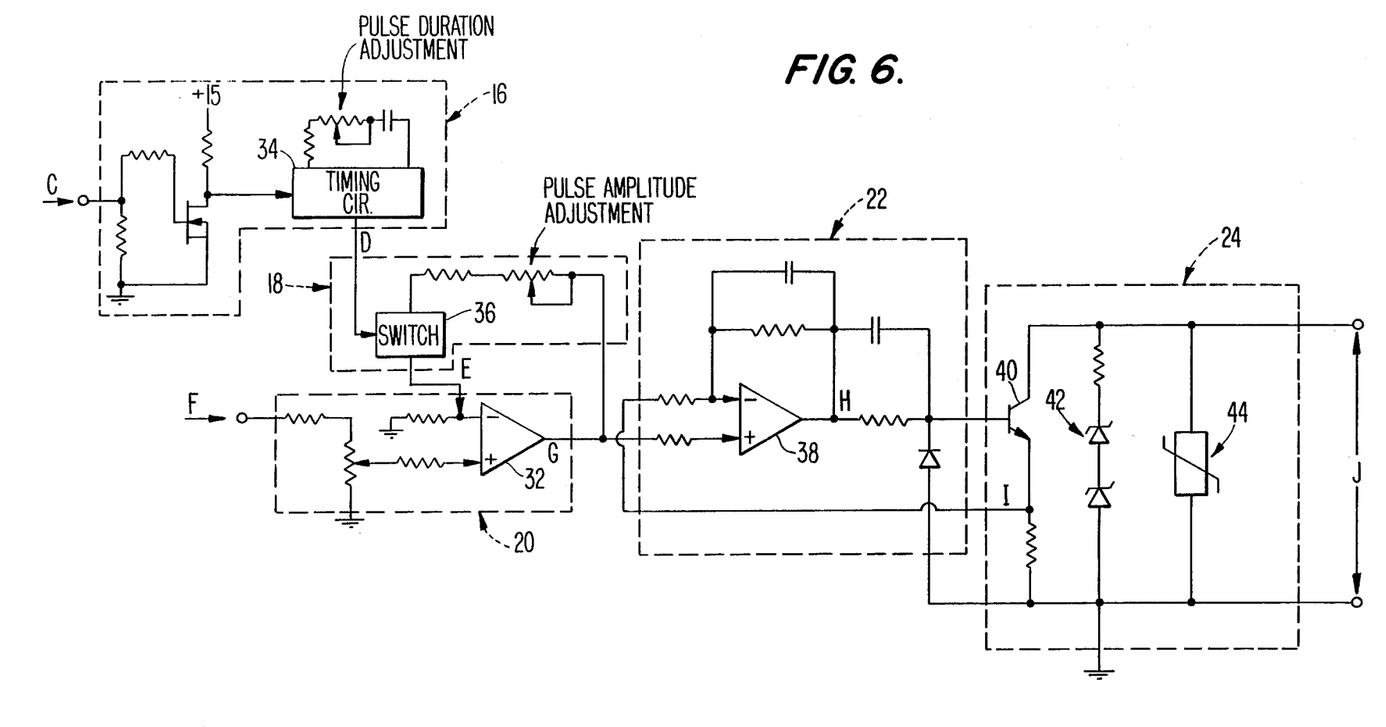
FIG. 6 is a schematic diagram of the pulsing board 12 of FIG. 4.

FIG. 6 provides a schematic illustration of a circuit arrangement which can be used to construct the block diagram of FIG. 4. As shown there, the analog output F from the receiver board 10 is provided to the positive terminal of an operational amplifier 32 in the high speed voltage amplifier circuit 20 throguh a voltage divider.

The pulse output C from the receiver board 10 is applied to a timing circuit 34 in the timer 16 through a level converter circuit. As shown in FIG. 6, the aforementioned pulse duration adjustment for the timer 16 is accomplished by using a RC circuit with a variable resistor. For purposes of example, the timing circuit 34 can be constructed of a commercially available timer identified by the codes CD 4047.

The output of the timing circuit D is, in turn, coupled to a switch 36 in the amplifier gain control circuit 18. An example of this switch 36 is sold under the code designation CD 4066. Pulse amplitude adjustment is carried out by a variable resistor arrangement in the feedback from the output of the operational amplifier 32. The output of the switch 36 constitutes the gain control signal E that is coupled to the negative input of the operational amplifier 32 to control its operation.

The high speed constant current amplifier 22 is formed of the operational amplifier 38 connected as shown to operate as a constant current amplifier. Incidentally, the operational amplifiers 32 and 38 can be constructed of the same type of operational amplifiers, if desired (with the connection arrangements being different, of course, to provide the desired different amplifying steps). One example of a suitable operational amplifier is sold under the code designation 741.

The output H of the operational amplifier 38 is applied, in turn, to the input of a bipolar transistor 40 of the driver circuit 24. As can be seen in FIG. 6, this transistor 40 is connected to serve as a constant current drive transistor. As shown, the transistor 40 is coupled to provide the feedback signal I from its emitter to the input of the operational amplifier 38. It also provides the output J across terminals connected to its collector and emitter. Zener diodes 42 and a high voltage suppressor 44 (which can be formed of back-to-back Zener diodes) are provided to prevent damage to the power regulator 26 in case of a voltage surge.

It should be noted that for simplicity of illustration, only single operational amplifiers are shown for the amplifiers 20 and 22, and only a single transistor is shown for the driver circuit 24. It is to be understood, of course, that plural operational amplifiers and transistors would often be used in actual practice depending upon the power levels involved, especially for the constant current amplifier 22 and the driver circuit 24.

As discussed earlier, the constant current power regulators operate to convert the voltage output J from the driver circuit 24 into a current signal K for controlling the laser discharges to provide a power output such as shown in FIG. 3. Although the present invention is not limited to this, the constant current power regulators 26 can be formed of beam power triode tubes connected together in a constant current configuration. These triode tubes will have their filaments controlled by the output J from the transistors 40 of the driver circuit 24. More specifically, as can be appreciated by comparing the waveforms of J and K in FIG. 5, the triodes will operate such that as the filament windings of the tubes are pulled down, the tubes will conduct to a greater extent. In other words, the lower the voltage outputs from the transistors 40 (i.e., the level of J), the higher the current which will be produced from the triodes. Therefore, the characteristic shown in K is obtained with the high pulse spikes of 225 ma being generated when the J output is at its low 25 volt level, and the constant 75 ma level is obtained when the signal J is at its higher control level of 75 volts. In the example shown, the pulse duration for the 225 ma level is approximately equal to 0.125 msec, although this, of course, can be varied as necessary to obtain the best laser output under the particular circumstances.

Although the present invention has been described in detail with regard to the preferred embodiment of the apparatus shown in FIGS. 4-6, it is to be understood that this is solely for purposes of example. In other words, the present invention regarding the generation of the laser power waveform shown in FIG. 3 is not limited only to the preferred embodiments of FIGS. 4-6, and other circuit arrangements to arrive at this waveform could also be used. Also, it is to be understood that modifications could be made to the structure of FIGS. 4-6 themselves which would still fall within the structure of the present invention.

While I have shown and described only one embodiment in accordance with the present invention, it is understood that the same is not limited thereto, but is susceptible of numerous changes and modifications as known to those skilled in the art. The method of the invention has applicability to laser processing of materials other than cutting, including welding, surface finishing, machining, etc. Therefore, I do not wish to be limited to the details shown and described hereto, but intend to cover all such changes and modifications as are encompassed by the scope of the appended claims.

I claim:

1. A method of processing a material comprising:
   generating a laser beam as a continuous output of a laser device which laser beam has a power waveform with respect to time characterized by a plurality of peak power pulses which exceed a maximum continuous wave (CW) power level at which the laser device can continuously operate and a CW power level which is sustained substantially constantly during the time between said peak power pulses, wherein the average power level of said laser power waveform is equal to or greater than said CW power level which is sustained substantially constantly during the time between said peak power pulses; and
   directing said laser beam against the material.

2. A method of processing a material according to claim 1, wherein said laser beam is directed against said material to cut said material.

3. A method of processing a material according to claim 2, wherein said material is selected from the group consisting of aluminum and an aluminum alloy.

4. A method of processing a material according to claim 2, wherein said material is selected from the group consisting of copper and a copper alloy.

5. A method of processing a material according to claim 2, wherein said material is stainless steel which is cut by said laser beam.

6. A method of processing a material according to claim 1, wherein said laser beam is a low order mode laser output of the laser device which is focused to minimize the beam diameter directed against the material whereby a relatively high power density of said beam is obtained for processing said material.

7. A method of processing a material according to claim 1, wherein the power of said peak power pulses is about 3 times that of the CW power level sustained between said peak power pulses.

8. A method of processing a material according to claim 1, wherein the duration of each of said peak power pulses is less than one half the time between said peak power pulses.

9. A method of processing a material according to claim 1, wherein the frequency of said peak power pulses is at least about 1 kHz.

10. A method of processing a material according to claim 1, wherein the CW power level sustained between said peak power pulse is substantially equal to said maximum CW power level.

11. A method of processing a material according to claim 1, wherein said laser beam is directed against the material to weld said material.

12. A method of processing a material comprising:
    generating a laser beam with a laser device which laser beam has a power waveform with respect to time characterized by a plurality of peak power pulses which exceed a maximum continuous wave (CW) power level at which the laser device can continuously operate and a CW power level which directly follows each of said peak power pulses, wherein the average power level of said laser power waveform is equal to or greater than said CW power level following said pulses; and
    directing said laser beam against the material.

13. A method of processing a material according to claim 12, wherein said laser beam is directed against said material to cut said material.

14. A method of processing a material according to claim 13, wherein said material is selected from the group consisting of aluminum and an aluminum alloy.

15. A method of processing a material according to claim 13, wherein said material is selected from the group consisting of copper and a copper alloy.

16. A method of processing a material according to claim 13, wherein said material is stainless steel which is cut by said laser beam.

17. A method of processing a material according to claim 12, wherein said laser beam is a low order mode laser output of a laser which is focused to minimize the beam diameter directed against the material whereby a relatively high power density of said beam is obtained for processing said material.

18. A method of proessing a material according to claim 12, wherein the power of said peak power pulses is about 3 times that of the CW power level following said pulses.

19. A method of processing a material according to claim 12, wherein the duration of each of said peak power pulses is less than one half the time between said peak power pulses.

20. A method of processing a material according to claim 12, wherein the frequency of said peak power pulses is at least about 1 kHz.

21. A method of processing a material according to claim 12, wherein the CW power level following said pulses is substantially equal to said maximum CW power level.

22. A method of processing a material according to claim 12, wherein said laser beam is directed against the material to weld said material.

23. An apparatus for generating and directing a laser beam against a material comprising:
    receiving means for receiving a digital current control signal and for providing an analog output corresponding to said digital current control signal;
    means for converting said analog output of said receiving means into a control signal having first and second control levels;

power regulating means for receiving the control signal and for generating a pulse signal based on said control signal, wherein said pulse signal has a waveform characterized by having a high pulse level when said control signal has said first control level and by having a low pulse level when said control signal has said second control level; and laser beam generating means coupled to receive the pulse signal from said power regulating means, and including means to generate a continuous laser beam having a laser power waveform which is characterized by a high pulse power level when the pulse signal has a high pulse level and by a continuous wave (CW) power level when the pulse signal has the low pulse level, and wherein said high pulse power level of said laser beam exceeds a maximum CW power level at which said laser beam generating means can operate continuously, and wherein said CW power level when the pulse signal has the low pulse level is maintained substantially constantly between said high pulse power levels such that the average power level of said laser power waveform is equal to or greater than said CW power level which is maintained substantially constantly between said high pulse power levels.

24. An apparatus according to claim 23, wherein said CW power level of said laser beam when the pulse signal has the low level is substantially equal to said maximum CW power level.

25. An apparatus according to claim 23, wherein the CW power level of said laser beam when the pulse signal has the low pulse level directly follows each of said high pulse power levels, and wherein the average power of said laser beam is equal to or greater than said CW power level.

26. In a laser apparatus comprising means for producing a continuous wave laser beam and means for directing said laser beam against a material to be processed, the improvement consisting said means for producing said continuous wave laser beam providing said laser beam with a power waveform with respect to time which is characterized by a plurality of peak power pulses which exceed a maximum continuous wave (CW) power level at which said laser apparatus can continuously operate, and a CW power level which directly follows each of said peak power pulses, and wherein the average power level of said laser beam is equal to or greater than said CW power level which directly follows said peak power pulses.

27. A method of processing a material according to claim 1, wherein said peak power pulses each have a duration of at least about 125 microseconds.

28. A method of processing a material according to claim 12, wherein said peak power pulses each have a duration of at least about 125 microseconds.

* * * * *

UNITED STATES PATENT AND TRADEMARK OFFICE
CERTIFICATE OF CORRECTION

PATENT NO. : 4,752,669

DATED : June 21, 1988

INVENTOR(S) : Charles M. SHARP et al.

It is certified that error appears in the above-identified patent and that said Letters Patent is hereby corrected as shown below:

Column 10, Claim 26, line 4, "consisting" should read --comprising--.

Signed and Sealed this

Fourteenth Day of July, 1992

Attest:

DOUGLAS B. COMER

*Attesting Officer* — Acting Commissioner of Patents and Trademarks